United States Patent Office 3,415,871
Patented Dec. 10, 1968

3,415,871
PREPARATION OF β-ACYLOXY-CARBOXYLIC ACIDS AND α,β-UNSATURATED CARBOXYLIC ACIDS BY OXIDATIVE CARBONYLATION
Kenneth L. Olivier, Placentia, Calif., assignor to Union Oil Company of California, Los Angeles, Calif., a corporation of California
No Drawing. Filed Aug. 9, 1965, Ser. No. 478,426
8 Claims. (Cl. 260—497)

ABSTRACT OF THE DISCLOSURE

Ethylenically unsaturated hydrocarbon olefins are reacted under oxidative carbonylation conditions to produce α,β-ethylenically unsaturated carboxylic acids and β-acyloxy carboxylic acids wherein the carboxylic acid portion has one more carbon than the olefin, by contacting the olefin, oxygen and carbon monoxide with an anhydrous reaction medium containing a Group VIII noble metal and, as the redox agent therefor, a ferric salt soluble in the reaction medium and a soluble halide. In a specific embodiment, ethylene is converted to acrylic and β-acetoxy propionic acid by oxidative carbonylation wherein ethylene, oxygen and carbon monoxide are introduced into contact with an acetic acid containing reaction medium which also contains about 0.2 weight percent palladium chloride, 0.2 weight percent lithium chloride, 0.2 weight percent ferric chloride and 0.2 weight percent lithium acetate. The oxidative carbonylation proceeds without the necessity for incorporating a dehydrating agent in the reaction medium as is required with previous oxidative carbonylations.

---

This invention relates to the oxidative carbonylation of olefins to carboxylic acids and in particular to unsaturated carboxylic acids. In a specific embodiment this invention relates to the oxidative carbonylations of ethylene to acrylic acid.

The unsaturated carboxylic acids such as acrylic acid are commercially prepared through relatively complex chemistry from expensive raw materials. Conventionally, acrylates or acrylic acid are perpared from raw materials such as acetylene, ethylene cyanohydrin, ketene and beta-propiolactone. The chemistry involved in the preparation of acrylic acid and acrylates from the aforementioned raw materials is quite complex and high yields of the acid are not readily obtained.

In copending application Ser. No. 371,751 there is disclosed a method for the oxidative carbonylation of olefins to carboxylic acids wherein an olefin, carbon monoxide and oxygen are contacted with an anhydrous carboxylic acid solution containing catalytic amounts of a platinum group metal and a suitable organic anhydride. While the aforementioned process provides very promising yields of acrylic acid from relatively inexpensive ethylene and carbon monoxide, an anhydride must be used to maintain the reaction zone anhydrous. Although there is no substantial consumption of the anhydride since the oxidative carbonylation is not a water producing reaction, the anhydride complicates the product recovery steps. The anhydride is necessary because spurious side reactions such as ester formation or oxidation of the olefin to carbonyl compounds produces water as a by-product and the presence of the water alters the course of the reaction and decreases the relative rate of carbonylation of the olefins.

I have now found that the aforementioned reaction can be conducted in the absence of any dehydrating agent provided that the reaction is conducted in the presence of iron or iron salts as cocatalysts for the oxdiation. Surprisingly, the dependency of the reaction upon the presence of a dehydrating agent is eliminated by this change without any drastic alteration of the yield of products from the oxidation.

During the reaction the platinum group metal is reduced from its highest valency state to a lower valence. The reduced metal is then oxidized to a higher valency by contacting of the liquid with oxygen. In accordance with my invention, a soluble iron salt is employed to facilitate this oxidation; however, the iron salt apparently also serves in some other fashion in that it eliminates the need for the organic dehydrating agent as described in the aforementioned copending application. The overall reaction is as follows:

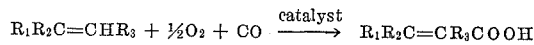

$$R_1R_2C{=}CHR_3 + \tfrac{1}{2}O_2 + CO \xrightarrow{\text{catalyst}} R_1R_2C{=}CR_3COOH$$

wherein the olefin is as hereinafter described and the catalyst employed is a platinum group metal with a soluble iron salt co-catalyst. The reaction is performed under liquid phase conditions with a solvent comprising an organic solvent of the type hereinafter described.

The reaction can be performed under relatively mild conditions and exhibits an attractive rate at temperatures from about 30° to about 300° C. at pressure sufficient to maintain liquid phase conditions.

Examples of useful olefins are the aliphatic and alicyclic hydrocarbon olefins having from 2 to about 12 carbons such as ethylene, propylene, butene-1, butene-2, pentene-2, cyclopentene, methylcyclopentene, 2-methylbutene-1, hexene-1, cyclohexene, octene-3, methylcyclohexene, 2-propylhexene-1, decene-2, 4,4-dimethylnonene-1, dodecene-1, isopropylcyclohexene, 6-propylnonene-1, methylcyclohexene, etc. Of these the aliphatic hydrocarbon alpha olefins having from 2 to about 6 carbons are preferred because of the greater reactivity of terminally unsaturated olefins and ethylene is most preferred because of the established market value of its products.

As previously mentioned, the reaction is performed under liquid phase conditions in the presence of a liquid organic solvent which has a solvency for the catalyst and which, preferably, is inert to the reaction conditions. Various organic liquids can be employed for this purpose such as sulfones, amides, ketones, ethers and esters. Carboxylic acids such as the lower molecular weight aliphatic acids having from 2 to about 10 carbons are preferred solvents and even when another solvent is used, it is preferred to maintain at least 10 percent of the solvent as an aliphatic carboxylic acid.

Illustrative of the preferred solvents are acetic, propionic, butyric, pentanoic, hexanoic, heptanoic, octanoic, pivalic, acrylic, beta-acetoxypropionic, etc. Of these, the aliphatic carboxylic acids having from about 2 to about 6 carbons are preferred. The carboxylic acids are not entirely insert under the oxidation conditions in that the carboxylic acids add to the olefin double bond to form beta-acyloxy compounds. These materials, however, can be readily pyrolyzed to recover both the carboxylic acid for reuse as the reaction medium and the desired unsaturated acid.

Another class of organic solvents that have sufficient solvency for the catalyst salts and that are inert to the oxidative carbonylation and which can be used in lieu of up to 90 percent of the aforementioned carboxylic acids are various sulfones, e.g., tetramethylene sulfone, methylbenzylsulfone, diisopropylsulfone, etc. Also useful are amides such as formamide, dimethyl formamide, ethylisopropyl formamide, acetamide, N-phenyl acetamide, N,N-dipropyl acetamide, isobutyramide, N-ethyl isobutyramide, isovaleramide, N,N-di-n-caprylamide, isoundecylamide, etc.

Various alkyl and aryl ketones can also be employed in the reaction solvent, e.g., acetone, methylethyl ketone, diethyl ketone, diisopropyl ketone, ethyl n-butyl ketone, methyl-n-amyl ketone, cyclohexanone, di-iso-butyl ketone, etc.

Various esters can also be employed in the solvent, e.g., ethyl formate, methyl acetate, ethyl acetate, n-propyl formate, iso-propyl acetate, ethyl propionate, n-propyl acetate, sec-butyl acetate, iso-butyl acetate, ethyl n-butyrate, n-butyl acetate, iso-amyl acetate, n-amyl acetate, ethyl formate, ethylene glycol diacetate, glycol diformate, cyclohexyl acetate, furfuryl acetate, iso-amyl n-butyrate, diethyl oxalate, iso-amyl isovalerate, methyl benzoate, diethyl malonate, valerolactone, ethyl benzoate, methyl salicylate, n-propyl benzoate, n-dibutyl oxalate, n-butyl benzoate, diiso-amyl phthalate, dimethyl phthalate, diethyl phthalate, benzyl benzoate, n-dibutyl phthalate, etc.

As previously mentioned, the reaction medium should contain catalytic amounts of a platinum group metal. The platinum group metal can be of the palladium sub-group or the platinum sub-group, i.e., palladium, rhodium or ruthenium or platinum, osmium or iridium. Of these metals, we prefer palladium because of its demonstrated greater activity. The platinum group metal can be employed in amounts between about 0.001 and about 5 weight percent of the liquid reaction medium; preferably between about 0.04 and about 2.0 weight percent. The platinum group metal can be added to the reaction medium as a finely divided metal, as a soluble salt or as a chelate. Preferably, the metal in its most oxidized form, i.e., as a soluble salt or chelate, is introduced into the reaction zone to avoid the formation of undesired quantities of water. Examples of suitable salts are the halides and carboxylates of the metals such as palladium chloride, rhodium acetate, ruthenium bromide, osmium propionate, iridium benzoate, palladium isobutyrate, etc.

To facilitate the rate of oxidation by rendering it more facile to oxidize the reduced form of the platinum metal, we prefer to employ a reaction medium that contains a halogen, i.e., a bromine or chlorine (preferably a chlorine) containing compound. The halogen can be added as elemental chlorine or bromine; however, it is preferred to employ less volatile halogen compounds such as hydrogen, alkali metal or ammonium halide, e.g., hydrogen chloride; hydrogen bromide, cesium chloride, potassium bromide; ammonium bromide, ammonium chloride, etc. Also, any of the aforementioned platinum group metals can be added as halides to supply a portion of the bromide or chloride and the aforementioned iron co-catalyst can also be added as ferrous or ferric chloride or bromide.

In general, sufficient of any of the aforementioned halogen containing compounds can be added to provide between about 0.05 and about 5.0 weight percent halogen in the reaction zone; preferably concentrations between about 0.1 and about 3.0 weight percent are employed. This amount of halogen is preferably also in excess of the stoichiometric quantity necessary to form the halide of the most oxidized state of platinum group metal, e.g., in excess of two atomic weights of halogen per atomic weight of palladium present. In this manner, a rapid oxidation can be achieved.

As previously mentioned, iron, iron oxides, or soluble iron salts are included in the reaction medium to accelerate the rate of reaction and to obviate the necessity for the use of an organic dehydrating agent. Metallic iron, ferrous or ferric oxides can be added to the reaction zone since under the oxidative conditions prevailing therein these materials will be dissolved as ferrous and ferric soluble salts, e.g., ferric chloride. Generally, however, the iron will be introduced as a soluble ferric or ferrous salt, the former being preferred because of its oxidation state and immediate availability as a redox agent without need for prior oxidation to the ferric state. In general, any suitable salt can be used as the halides, e.g., ferric chloride, ferrous bromide, ferric iodide, ferrous fluoride; other soluble anions, e.g., ferric nitrate, as well as the soluble carboxylates such as the ferric and ferrous salts of the lower molecular weight carboxylic acids, e.g., ferric acetate, ferrous propionate, ferric butyrate, ferrous valerate, etc. In general, the iron is added to the reaction medium to provide a concentration of the metal therein between about 0.1 and 10 weight percent; preferably between about 0.5 and about 3.0 weight percent.

Various other oxidizing agents can also be employed to accelerate the rate of reaction such as nitrogen oxides which function as redox agents to redissolve the palladium as palladous ion for reuse in the reaction. In general, between about 0.01 and about 3 weight percent of the reaction medium; preferably between about 0.1 and about 1 weight percent; calculated as nitrogen dioxide can comprise a nitrogen oxide that is added as a soluble nitrate or nitrite salt or as a nitrogen oxide. The nitrogen oxides can be added to the reaction medium in various forms, e.g., nitrogen oxide vapors such as nitric oxide, nitrogen dioxide, nitrogen tetraoxide, etc. can be introduced into contact with the reaction medium during the oxidation to fix the aforementioned nitrogen oxide content therein or soluble nitrate or nitrite salts such as the alkali metal salts, e.g., sodium nitrate, lithium nitrate, lithium nitrite, potassium nitrate, cesium nitrate, etc., ammonium nitrate or nitric acid, can be added to the reaction medium.

The process can be performed in two separate stages wherein the olefin and carbon monoxide are contacted in a first stage with a substantially anhydrous solution or slurry of the aforementioned catalyst salts, the products are recovered therefrom and the resulting solution of inactivated catalyst is then regenerated in a second stage. In this technique, the salts of platinum group metal and iron do not truly function as catalysts but instead as oxidants or oxygen carriers since they are reduced to an inactive and lower oxidation state in the reaction zone, e.g., palladium and ferrous salts, in an amount stoichiometrically equivalent to the amount of oxidized product produced. In the regeneration or second stage the solution or slurry of the reduced metals is contacted with an oxidant, typically oxygen or mixtures of oxygen and inert gases such as nitrogen, carbon dioxide, etc., e.g., air, to oxidize the metals to the active, higher oxidation state for recirculation.

To obviate the necessity of high circulation rates between stages, it is within the scope of my invention to increase the inventory of ferric oxidant in excess of that which is soluble in the reaction medium. This results in a slurry which can contain from 0.5 to about 40 weight percent of any of the aforementioned ferric salts or ferric oxide; preferably from 3 to about 15 weight percent is used. In the reaction zone the ferric is reduced to ferrous oxide or a ferrous salt and in the regeneration the ferrous compound is reoxidized to the ferric state.

The solution or slurry introduced into the reaction zone should be substantially anhydrous even though no dehydrating agent is necessary. Preferably, the solution or slurry is treated after regeneration by distillation or other dehydration steps to remove at least some of the water formed in the regeneration and to provide a recirculating liquid containing less than 10 weight percent and, most preferably, less than 5 weight percent water prior to its introduction into the reaction zone.

In the absence of any water in the reaction zone the oxidative carbonylation forms an acid anhydride or acid chloride of the desired acid product. With low conversions per pass of liquid and metal salts the aforementioned preferred limits of water contents still provide sufficient water to effect hydrolysis of the anhydride or chloride to the desired acid product. However, if sufficient water is not present, it is within the scope of my invention to add sufficient water, e.g., from 1 to 10 weight percent to the liquid effluent removed from the reaction stage to effect the hydrolysis. Preferably, the hydrolysis is effected before the distillation recovery of the desired products.

Separate staging of the reaction and regeneration steps also permits optimizing of the temperature and pressure used in each stage. In general, the temperatures used in these stages will be from about 30° to 300° C.; preferably from about 90° to 200° C. The pressures employed will be sufficient to maintain a liquid phase; e.g., from 1 to about 200 atmospheres or more and preferably from 10 to about 100 atmospheres.

The preferred technique is a single stage continuous contacting wherein the platinum group metal and iron salt function in the same fashion; however, oxygen is concurrently introduced and the metals continuously cycle between high and low oxidation states in the single stage reaction. In this technique, therefore, the metals function more similarly to catalysts for although they participate in the reaction there is no net change in their oxidation state. Lower concentrations of the iron compound can be used in this technique since the continuous introduction of oxygen obviates the need to maintain a high inventory of the redox oxidant and concentrations from about 0.5 to 3.0 weight percent can be used. The preferred technique comprises the introduction of oxygen together with the olefin and carbon monoxide, into contact with the liquid reaction medium maintained in a single reaction zone. The carbonylation of the olefin and oxidation to the carboxylic acid results in the stoichiometric reduction of the platinum group metal. The introduction of oxygen serves to reoxidize the reduced metal to its more oxidized and active form. This reoxidation forms a stoichiometric quantity of water; however, the water is consumed in formation of the desired acid product so that no accumulation of water results during the continuous single stage reaction. In accordance with my present discovery, the reaction need not be maintained under anhydrous conditions by inclusion of a dehydrating agent but, instead, a continuous preparation of alpha,beta-unsaturated or beta-acyloxycarboxylic acids can be achieved by use of the ferric co-catalyst.

The oxygen can be introduced into contact with the liquid reaction medium at a rate controlled in response to the oxygen content of the exit gases from the reaction zone. Continuous or intermittent introduction of oxygen can be employed; however, continuous introduction is preferred. Preferably, the rate of oxygen introduction is controlled to maintain the oxygen content of the exit gases below the explosive concentration, i.e., less than about 10 and preferably less than about 3 volume percent. When a gaseous olefin such as ethylene is used, it can suitably be employed in excess and serve as the diluent in the gas phase. If desired, however, inert gases such as carbon dioxide, nitrogen, etc., can be introduced to dilute the oxygen content in the gas phase and this technique is particularly useful when a liquid olefin such as octene-1 is being oxidized. When excess ethylene is used, the excess gas comprising chiefly the olefin and carbon monoxide can be recycled to the liquid reaction medium. When the olefin is a liquid under the reaction conditions, however, and when an inert gas such as nitrogen, air or mixtures of nitrogen and air are employed to dilute the gas phase and exit gas stream from the reactor, recycling is not necessary.

The carbon monoxide is introduced into contact with the reactants at a sufficient rate to insure that the desired carbonylation occurs. Relative ratios of the carbon monoxide based on the olefin can be from 1:10 to 10:1 molecular units per molecular unit of olefin, preferably ratios from about 1:1 to about 5:1 and most preferably from 1:1 to 2:1 molecular ratios are employed.

The reaction can be performed under relatively mild conditions, e.g., temperatures from about 30° to about 300° C.; preferably from about 90° to about 200° C., are employed. The reaction pressure employed is sufficient to maintain a liquid phase and preferably, when gaseous olefins are employed, superatmospheric pressures are used to increase the solubility of the olefin in the reaction medium and thereby accelerate the reaction rate. Accordingly, pressures from about atmospheric to about 200 atmospheres or more, preferably elevated pressures from about 10 to about 100 atmospheres are used.

During the oxidation a portion of the liquid reaction medium can be continuously withdrawn and distilled to recover the desired products from the reaction medium which contains the catalyst salts and which is recycled for further contact to the reaction zone. If desired, the products can be continuously stripped from the reaction zone and removed as a vaporous overhead stream which is cooled to condense the products which are then fractionated by distillation into the desired products. To effect stripping of the products from the reaction zone, a high circulation rate of a stripping gas, e.g., nitrogen, carbon dioxide, etc., is passed through the reactants and recycled. The carbon monoxide can be used in excess as a stripping gas. When a gaseous olefin such as ethylene is oxidized it also can be introduced into the reaction zone at high rates, in excess of that necessary for the oxidation to provide a stripping gas for product removal. The gas is separated from the condensible liquid products and recycled to further contacting. In this manner, the catalyst metals remain in the reaction zone and do not interfere with the product recovery steps.

The following examples will illustrate the practice of my invention and serve to demonstrate the results obtainable thereby:

Examples

To a one-half gallon titanium-lined autoclave were added 500 grams acetic acid, 1 gram palladium chloride, 1 gram ferric chloride, 1 gram lithium chloride and 1 gram lithium acetate. The autoclave was closed and pressured to 450 p.s.i.g. with ethylene and then to 900 p.s.i.g. with carbon monoxide. The autoclave was then heated to 300° F. and maintained at that temperature while slowly introducing oxygen in 10–20 p.s.i.g. increments over a 30-minute reaction period. After the reaction period the autoclave was cooled, vented and opened and the liquid product was collected and distilled to recover the following products:

| Product | Grams |
|---|---|
| Acrylic acid | 4.2 |
| Beta-acetoxypropionic acid | 32.0 |
| Propionic acid | Trace |
| Polyacrylic acid | 4.0 |

The vent gases from the autoclave revealed a total of 15.0 grams carbon dioxide had been formed during the oxidation. When the experiment was repeated with propylene, crotonic acid was recovered as the major product.

The preceding experiment was repeated with the use of cupric chloride in lieu of ferric chloride. Upon introduction of oxygen a reaction occurred which was conducted over a 30-minute period. Upon completion of the oxidation, however, the products were analyzed and no carbonylated products were obtained, i.e., no acrylic acid or beta-acetoxypropionic acid were formed in this oxidation. Instead, the main products were acetaldehyde and vinyl acetate.

The oxidation was repeated with the use of 5 grams of various multivalent metal salts in lieu of the ferric chloride. These included soluble salts of cobalt, vanadium, chromium, manganese, ruthenium, tin, nickel and molybdenum. Although some oxidation was observed in all of these oxidation reactions, substantially no conversion to acrylic acid was observed in most of the oxidations and only minor amounts of acrylic acid and beta-acetoxypropionic acid were obtained in the experiments using manganese and vanadium salts.

The preceding experiments demonstrate that ferric salts are unique in their ability to co-catalyze the oxidative carbonylation of olefins to the formation of alpha,beta-unsaturated carboxylic acids and beta-acetyloxy aliphatic acids from the aforementioned olefins.

The preceding examples are not intended to be unduly limiting of the invention but are intended solely to illustrate the mode of practicing the invention and to demonstrate results obtainable thereby. It is intended that other procedures and other reagents which are substantial equivalents of those expressly set forth in the preceding examples are included within the scope of the invention and that the invention is to be defined by the steps and their obvious equivalents set forth in the following claims.

I claim:

1. The method for the oxidative carbonylation of a hydrocarbon olefin selected from the class consisting of aliphatic and alicyclic ethylenically unsaturated olefins having from 2 to about 12 carbons that comprises contacting, in a reaction zone, said olefin, oxygen and carbon monoxide with a substantially anhydrous reaction medium consisting essentially of a hydrocarbon aliphatic carboxylic acid having 2 to about 10 carbons and containing from 0.001 to 5.0 weight percent of a platinum group metal and from 0.5 to 40.0 weight percent of ferric oxide or a ferric salt soluble in said reaction medium, from 0.05 to 5.0 weight percent of a soluble halide selected from the class consisting of alkali metal, ammonium and hydrogen bromides and chlorides; maintaining the temperature in said zone between about 30° and 300° C. and the pressure in said zone between 1 and about 200 atmospheres, sufficient to maintain said reaction medium in liquid phase and to oxidize said olefin by replacing a hydrogen on one of the unsaturated carbons with a carboxylic acid group.

2. The method of claim 1 which comprises using palladium as said platinum group metal.

3. The method of claim 1 which comprises using a chloride as said soluble halide.

4. The method of claim 1 which comprises using ethylene as said olefin.

5. The method for the oxidative carbonylation of a hydrocarbon olefin to alpha,beta-ethylenically unsaturated carboxylic acids and beta-acyloxycarboxylic acids having one more carbon than said olefin which comprises contacting, in a reaction zone, a hydrocarbon olefin selected from the class consisting of aliphatic and alicyclic ethylenically unsaturated olefins having from 2 to 12 carbons with a substantially anhydrous reaction medium consisting essentially of a hydrocarbon aliphatic carboxylic acid having from 2 to about 10 carbons and containing from 0.001 to 5.0 weight percent of a platinum group metal and from 0.5 to 3.0 weight percent of a ferric salt soluble in said reaction medium and from 0.05 to 5.0 weight percent of a soluble halide selected from the class consisting of alkali metal, ammonium and hydrogen bromides and chlorides; simultaneously contacting said reaction medium with oxygen while maintaining said reaction zone at a temperature between about 30° and 300° C. and at a pressure between 1 and about 200 atmospheres and sufficient to maintain said reaction medium in liquid phase.

6. The method of claim 5 which comprises using palladium as said platinum group metal.

7. The method of claim 5 which comprises using a chloride as said soluble halide.

8. The method for the oxidative carbonylation of ethylene to acrylic and beta-acetoxypropionic acid that comprises contacting, in a reaction zone, ethylene and oxygen with a substantially anhydrous reaction medium consisting essentially of acetic acid containing from 0.001 to 5.0 weight percent of palladium, from 0.5 to 3.0 weight percent of a ferric salt soluble in said reaction medium and from 0.05 to 5.0 weight percent of a soluble halide selected from the class consisting of alkali metal, ammonium and hydrogen bromides and chlorides; maintaining said reaction zone at a temperature between 30° and 300° C. and at a pressure between 1 and about 200 atmospheres, sufficient to maintain said reaction medium in liquid phase.

References Cited

UNITED STATES PATENTS 3,349,119   10/1967   Fenton et al. _____ 260—497

FOREIGN PATENTS 6,408,476   1/1965   Netherlands.

OTHER REFERENCES

Tsuji et al.: Tetrahedron Letters No. 16, pp. 1061–1064, 1963.

LORRAINE A. WEINBERGER, *Primary Examiner.*

V. GARNER, *Assistant Examiner.*

U.S. Cl. X.R.

260—533, 410.9, 486, 468